Figure 1:
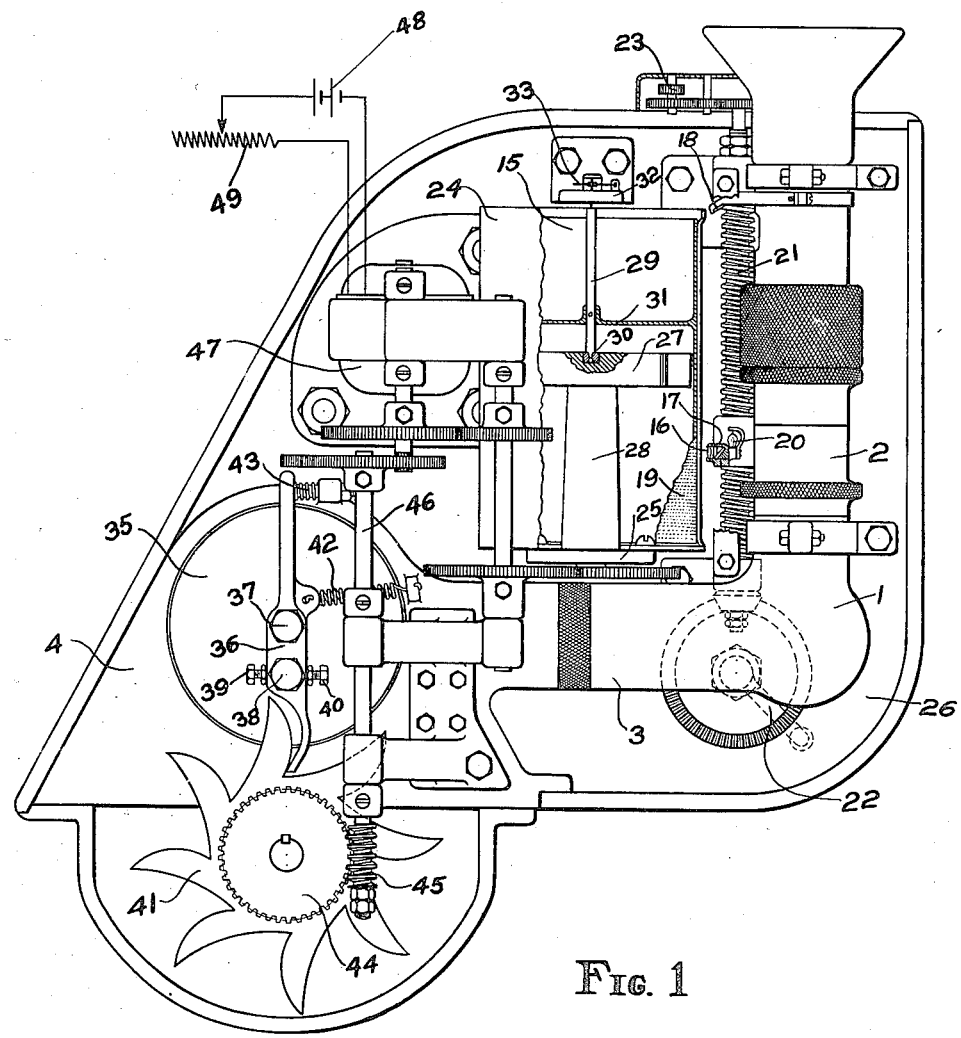

Sept. 23, 1924.

R. V. MORSE

AIRPLANE SPEEDOMETER

Filed April 16, 1921

1,509,167

2 Sheets-Sheet 1

INVENTOR

Robert V Morse

Sept. 23, 1924.  
R. V. MORSE  
AIRPLANE SPEEDOMETER  
Filed April 16, 1921  
1,509,167  
2 Sheets-Sheet 2
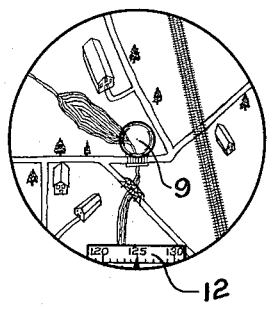
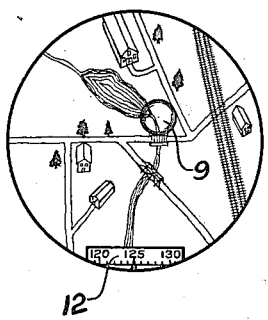
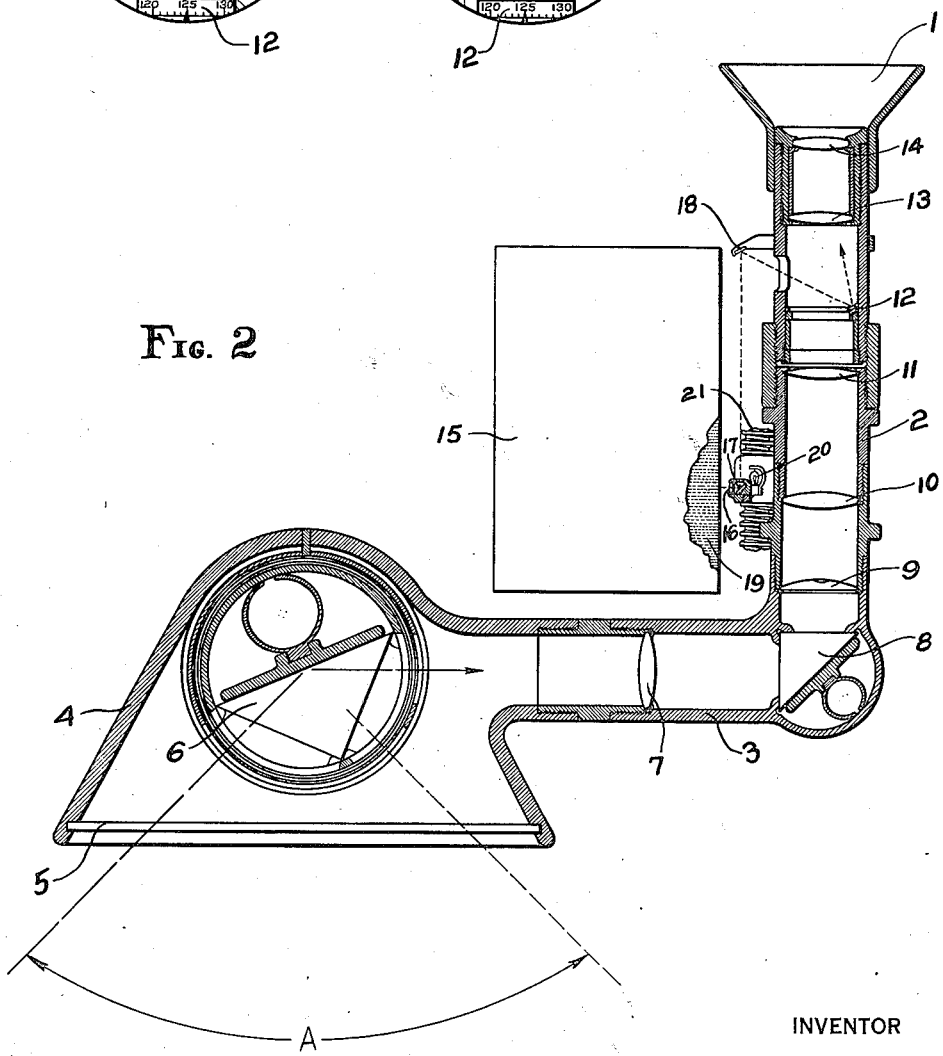
INVENTOR Patented Sept. 23, 1924.

1,509,167

UNITED STATES PATENT OFFICE.

ROBERT V. MORSE, OF ITHACA, NEW YORK.

AIRPLANE SPEEDOMETER.

Application filed April 16, 1921. Serial No. 462,004.

*To all whom it may concern:*

Be it known that I, ROBERT V. MORSE, a citizen of the United States, residing at Ithaca, in the county of Tompkins and State of New York, have invented a new and useful Airplane Speedometer, of which the following, taken with the accompanying drawings, is a specification.

This invention relates to aircraft, and in particular to the instruments by which the speed of the aircraft relative to the ground is measured. It has for its objects the continuous indication of the ground speed, the elimination of some of the various errors inherent in prior instruments, and other objects as will become apparent as the description proceeds.

In the drawings forming part of this specification, Fig. 1 is a side elevation partly in section showing the working parts of the instrument as exposed to view when the cover of the case is removed. Fig. 2 is a sectional view showing the optical parts. Fig. 3 and Fig. 4 show the field of view of the instrument as in action.

Referring first to Fig. 2, the telescope 1 has a vertical tube 2, a horizontal tube 3, and a hood 4 whose open bottom is covered by a plate of glass 5 so as to protect the interior from dirt and moisture. Inside the hood 4 a reflecting prism or mirror 6 is mounted in suitable bearings so that it can turn or swing thru the angle A. The light reflected from the prism 6 passes thru the objective lens 7 in the tube 3 and is then reflected by the prism or mirror 8 so as to pass up the vertical tube 2 where it forms an inverted image in the region of the leveling bubble 9. The light passes on thru the reversing lenses 10 and 11 which give a rectified image in the region of the small reflecting mirror 12, which is viewed thru the lenses 13 and 14 of the eye-piece. The fluid and case containing the leveling bubble 9 are transparent, and the edges of the bubble refract the light so as to make a dark spot visible in the field of view of the telescope. The ground speed of the aircraft,—automatically determined as will be explained,— is reflected on to the small mirror 12, which lies in the second or rectified focal plane of the telescope.

The field of view of the telescope thus shows three things, namely,—the landscape as reflected by the mirror 6, the leveling bubble 9 with its motion inverted, and the scale reading of the ground speed of the aircraft. It will be noted that the optical system is essentially the same as the ordinary terrestrial telescope, with a movable mirror to send in the light, a leveling bubble in the region of the usual inverted image, and a scale mirror in the region of the rectified image; and it will be obvious to those skilled in the art that the system is not limited to the particular form herein illustrated, but can be applied in various modifications to most of the ordinary forms of telescopes and field glasses.

One special feature of this invention is that the curvature of the leveling glass 9 is given such a value that for each degree that the telescope is moved from the vertical position the bubble 9 will move by an amount corresponding to a degree in the field of vision of the telescope. For example, if the field of vision is twenty degrees, the level 9 is so calibrated that for each degree of inclination of the telescope the bubble will move across one-twentieth of the field. Owing to the inversion of the image, the bubble appears to move backward when the telescope is swung forward. Since the landscape also appears to move backward when the telescope is swung forward, the bubble 9 appears to remain on the same location relative to the landscape when ordinary slight inclinations of the telescope occur from time to time. Thus the bubble 9 tends to move around with the landscape, and the slight inclinations which continually occur even when every attempt is made to keep it level when flying are automatically compensated so as to permit a continuous and more accurate reading. If a level of the mercury drop type is used instead of a bubble, it should be located in a focal plane where the image is not inverted, since a drop moves opposite to a bubble.

In order to obtain a reading of the ground speed the same general principles are employed as are generally used to obtain the velocity of an object at a distance,—that is, the angular velocity of the object is measured, and the linear distance of the object being known, the linear velocity of the object can then be determined. In order to measure the angular velocity of an object on the ground, the prism 6 is turned slowly and steadily so as to keep the same object reflected in its field of view, and this motion of the prism 6, suitably modified and multiplied, is measured by a speedometer whose drum 15 carries a scale calibrated for the particular altitude and reading miles per hour for example,—which reading is magnified by a small lens 16, and reflected by small mirrors or prisms 17 and 18 to the mirror or prism 12 in the telescope tube 2 so that it is seen in the field of vision of the telescope. Since, with any given angular velocity of the prism 6, the linear speed differs according to the altitude of the aircraft, a different scale is provided for each altitude at intervals of 100 feet for example running from 1,000 to 10,000 feet altitude. These scales may read in miles per hour or other suitable units, and run circumferentially around the drum 15. In order that these scales 19 may be contained on a drum of moderate dimensions the figures are reduced photographically to say one quarter size and then magnified by the lens 16,—being illuminated by the small electric light 20. The lens 16, mirror 17 and light 20 are adjusted vertically according to the altitude by the operation of the screw 21, so as to lie opposite the proper scale on the drum 15.

Referring now to Fig. 1, the operating mechanism will be described more in detail. The altitude screw 21 is turned by the hand-crank and bevel gearing 22, and the motion is recorded at the counter or indicator 23, at which the altitude setting is read by the operator. The speedometer consists of the drum 15 carrying the numerous scales 19 as described, enclosed in a cylindrical case 24 provided with a vertical slot opposite the little lens and mirror 16 and 17 so that the scales are exposed at that point, this casing 24 being secured to a bracket 25 which is fastened to the housing or case of the apparatus 26. A rotatable magnet 27 is mounted within the drum 15, this magnet 27 being mounted on a shaft which passes thru the journal bearing 28, which in turn is attached to the bracket 25. A small shaft 29 is mounted in a jeweled bearing 30 carried in the magnet wheel 27, and supports the drum 15 by means of the diaphragm 31. The upper part of the shaft 29 is journaled in a bearing in the bracket 32. The shaft 29 and drum 15 are restrained from free rotation by a hair spring 33 which opposes the magnetic or inductive drag of the magnet 27 when rotating inside of the drum 15. This drag or torque is proportional to the speed of rotation of the magnet, and so balanced by the spring 33 that the drum comes to rest at a position corresponding to the rotative speed of the magnet 27.

The intermediate gearing connecting the magnet 27 to the mirror or prism 6, whose angular velocity is to be measured, will now be described. The prism 6 is secured to the rotating head 35 which turns in suitable bearings in the hood 4. A follower finger 36 is secured to the head 35 by bolts or studs 37 and 38,—the lower bolt or stud 38 being slightly smaller than the hole in the finger 36 thru which it passes, so that the finger 36 can be adjusted relative to it by set screws 39 and 40. This permits the angularity of the prism 6 and finger 36 to be precisely adjusted on assembly, after which the nuts 37 and 38, and screws 39 and 40 are tightened down, securing the finger in precisely the proper position. The finger or follower 36 is oscillated by the cam wheel 41 which swings the finger 36 against the tension of the spring 42. The short working face of the follower 36 where it bears against the cam 41 is preferably made straight, and when in mid-position as shown is inclined at an angle to the line of centers of the cam 41 and finger 36,— the resulting shape of cam tooth being such as to permit the wheel 41 rotating uniformly to pick up the follower 36 without delay after each oscillation. The cam wheel 41 turns slowly in a clockwise direction, swinging the finger 36 until it clears the tip of the cam tooth, whereupon the finger 36 is promptly swung back by the action of the spring 42,—the top end of the finger striking the buffer pin 43 so as to bring the rotating head to rest without undue shock. The lower end of the finger 36 is immediately picked up by the next tooth of the cam wheel and slowly carried thru a complete swing as before, and so on as long as the wheel 41 is rotated. It will be noted that when the ground is travelling at a uniform rate under the aircraft and the prism 6 is directed at some object far in advance of the aircraft, the prism will not have to swing so rapidly to keep on the object as it will when the object comes directly below it. In other words, the angular velocity varies when the linear speed is a constant. This variation is considered in designing the shape of the cam teeth 41, in order that a uniform speed of the observed object may be balanced by a uniform speed of rotation of the cam wheel 41.

The cam wheel 41 is rotated by a worm wheel 44 driven by a worm 45 on a shaft 46. This shaft 46 is connected by gearing to a small electric motor 47, which is also connected by gearing to the shaft of the magnet 27 journaled in the bearing 28. The magnet 27 is thus rotated proportionally to the rotation of the cam wheel 41, though at a much higher rate of speed. The speed of the motor 47,—and consequently the speed of the prism 6 and magnet 27,— is controlled by a variable rheostat 49 in the circuit of the motor 47, which is run from the battery 48.

The operation of the apparatus can now be followed in detail. The operator looks down thru the telescope tube 1 and sees the landscape moving backward beneath him across the field of vision. He then adjusts the rheostat 49 so as to increase the speed of the motor 47, and as the rate of motion of the prism 6 increases the landscape appears to travel more slowly across the field of vision, until the landscape finally appears to come to a stop, and the same objects remain continuously visible in the field for the period of one oscillation of the prism 6. This means that the speedometer drum 15 is being deflected proportionally to the angular velocity of the ground relative to the aircraft. The indicator 23 having been previously adjusted to the altitude at which the aircraft is flying, the reading of the speed of the ground relative to the aircraft is shown directly in the mirror 12 in the field of view of the telescope, as in Fig. 3 or Fig. 4 for example,—in such units as desired, such as miles per hour or kilometers per hour. If the rheostat 49 is adjusted so as to run the motor 47 too fast, the landscape will begin to move forward across the field of view,—as though the aircraft were moving backward. In practice the landscape does not generally stay exactly stationary for any great length of time, as the speed of the aircraft or the wind is generally varying slightly; but whenever a satisfactory setting is obtained it can be caught and read directly on the scale mirror 12, and even when the speed is varying the variation can be continuously observed on the scale so that a quite accurate valuation of the average speed can be made. Thus the fact that the indicated speed is continuously visible to the same eye that is observing the landscape makes possible a more accurate determination of the speed of the ground relative to the aircraft.

The landscape has been described as stationary in the field of view when the controlling rheostat 49 is properly adjusted; it will be understood that this means stationary relative to the bubble when an automatic compensating bubble is employed as has been described. For example, when the aircraft, or at least the speedometer apparatus, is exactly level, the landscape may appear as in Fig. 3; then a slight tilt of the aircraft may cause the landscape and bubble to shift as in Fig. 4. The fact that the landscape has not shifted relative to the bubble indicates that the shift was not due to a change in the speed of the ground relative to the aircraft, but merely to a tilt in the position of the aircraft or observing instrument. Such a tilt would ordinarily introduce an error in the speed determination, but is here automatically compensated by the corresponding shift of the bubble so that the reading of the ground speed can continue without much error or interruption. In addition to this compensating bubble, the whole apparatus may be mounted in gimbal rings in the usual manner so that it can be leveled independently of the aircraft if desired.

I am aware that a bubble used as a level in the field of vision of a telescope is old, the bubble being maintained in the center of the sight or at some other fixed point by adjusting the level of the apparatus; as distinguished from this, the bubble in the present invention is employed as a shifting indicator point, which automatically moves to certain positions under certain conditions and may continue to function indefinitely as an indicator point in any part of the field of view just as well as at the center. I am also aware that it is old to measure the speed of a distant object relative to the observer by following it with the line of sight of a telescope, mirror, prism or similar optical apparatus so as to measure its angular velocity, and to convert it into linear speed in the ordinary trigonometrical manner when a linear distance or other linear dimension is known, as is commonly done in astronomical and other physical instruments, and in range keepers for ordnance, and various airplane instruments. Hence I make no claim to the general method of measuring such speeds by measuring the angular velocity; but rather my invention does reside in the improved means hereinafter claimed by which the reading desired may be obtained more steadily and accurately. It will be obvious to those skilled in the art that the invention is not limited to the particular construction herein shown for the purposes of illustration, but that it is open to various modifications and adaptations in various designs without departing from the scope of the invention as described in the following claims.

I claim:

1. In optical apparatus, the combination of a telescope, a speedometer mechanism by which the speed of objects viewed thru the telescope may be determined, and means whereby the reading of said speedometer may be shown in the field of view of the telescope, so that both the reading and the external objects viewed may be simultaneously observed.

2. In optical apparatus, the combination of a telescope, a shifting indicator means responsive to small angular tiltings located in said telescope so as to be visible in the field of view and arranged so that when the telescope is moderately tilted in any direction the indicator means will appearently move in the field of view in the same direction and amount as the external objects in the field of view whereby moderate errors in the leveling of the telescope are automatically compensated, a speedometer mechanism by which the speed of objects viewed thru the telescope may be determined, and means whereby the reading of said speedometer may be shown in the field of view of the telescope, so that the reading, the external objects, and the indicator means may be simultaneously observed.

3. In optical apparatus, the combination of a speedometer drum having a large number of different scales, a telescope, optical means whereby the scale reading of the speedometer drum is magnified and transmitted into the field of vision of the telescope, and means for adjusting the optical means so that any particular scale may be selected and read.

4. In optical apparatus, the combination of a speedometer drum having a large number of different scales, a reflecting optical element, a screw by which the optical element may be adjusted longitudinally of the drum so that it may reflect any particular one of the scales desired, control means by which the screw is operated, and an indicator by which the setting of the screw may be read.

5. In optical apparatus, the combination of a telescope, a reflecting element by which the light may be reflected into said telescope, a holder for said element mounted so that it may oscillate, a follower mechanically connected to said holder, a cam arranged to operate said follower, holder, and reflecting element, a speedometer, an electric motor mechanically connected to both the cam and the speedometer so as to operate them simultaneously, means for varying the speed of the motor, whereby the reading of the speedometer may be varied, an adjusting means independent of the motor whereby the speedometer reading may be varied according to an independent factor, and means for reflecting the resultant reading so as to be visible in the field of vision of the telescope.

6. In optical apparatus, the combination of a telescope, a reflecting element by which the light may be reflected into said telescope, a holder for said element mounted so that it may oscillate, a follower mechanically connected to said holder, means whereby said follower may be precisely adjusted relative to said holder, and means for oscillating said follower.

7. In optical apparatus, the combination of a telescope, a reflecting element by which the light may be reflected into said telescope, a holder for said element mounted so that it may oscillate, a follower mechanically connected to said holder, a wheel having cam teeth arranged to operate said follower, the configuration of the cam teeth and follower being so proportioned that when the apparatus is mounted in an aircraft flying horizontally and the line of sight of the reflecting element is directed at an object on the ground, the rotation of the cam wheel at a uniform angular velocity may neutralize the apparent motion of the object when the aircraft is moving at a uniform speed relative to the ground.

8. In optical apparatus, the combination of a telescope, a reflecting element by which the light may be reflected into said telescope, a holder for said element mounted so that it may oscillate, a follower mechanically connected to said holder, a wheel having cam teeth arranged to operate said follower, the working face of the follower being straight and inclined to the line of centers of the cam wheel and follower when in mid position of operation, the shape of the cam teeth being such that the follower may be promptly picked up by the next tooth after each oscillation when the cam wheel is rotating uniformly.

9. In optical apparatus, the combination of a telescope, a reflecting element by which the light may be reflected into said telescope, a holder for said element mounted so that it can oscillate, a follower mechanically connected to said holder, a wheel having cam teeth arranged to operate said follower, a worm gearing mechanically connected to operate said wheel, a speedometer, an electric motor mechanically connected to both the worm and the speedometer so as to operate them simultaneously, means for regulating the speed of the electric motor, and means for reflecting the reading of the speedometer into the field of vision of the telescope.

In witness whereof I have hereunto set my hand this 14th day of April, 1921.

ROBERT V. MORSE.